United States Patent Office 2,977,130
Patented Mar. 28, 1961

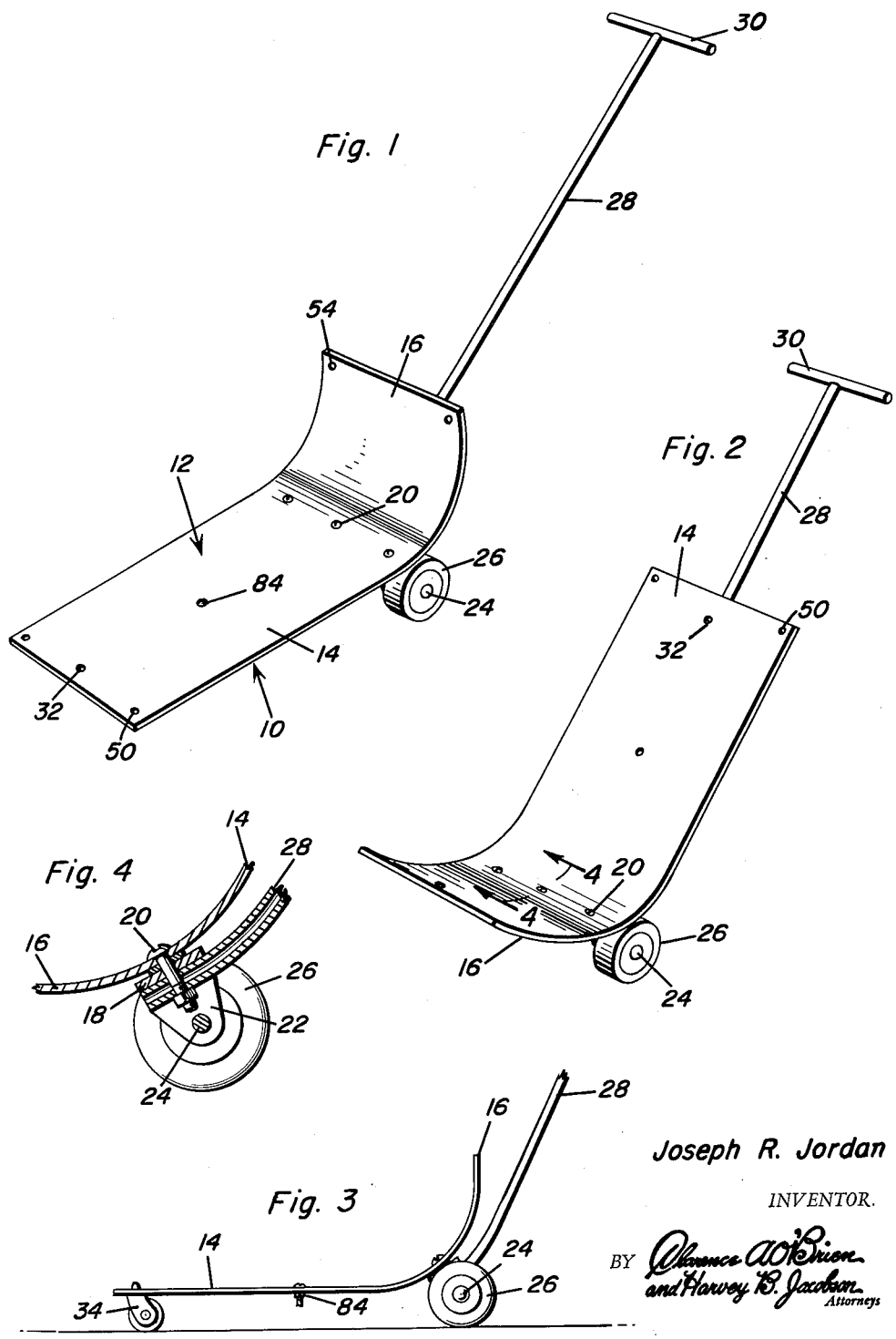

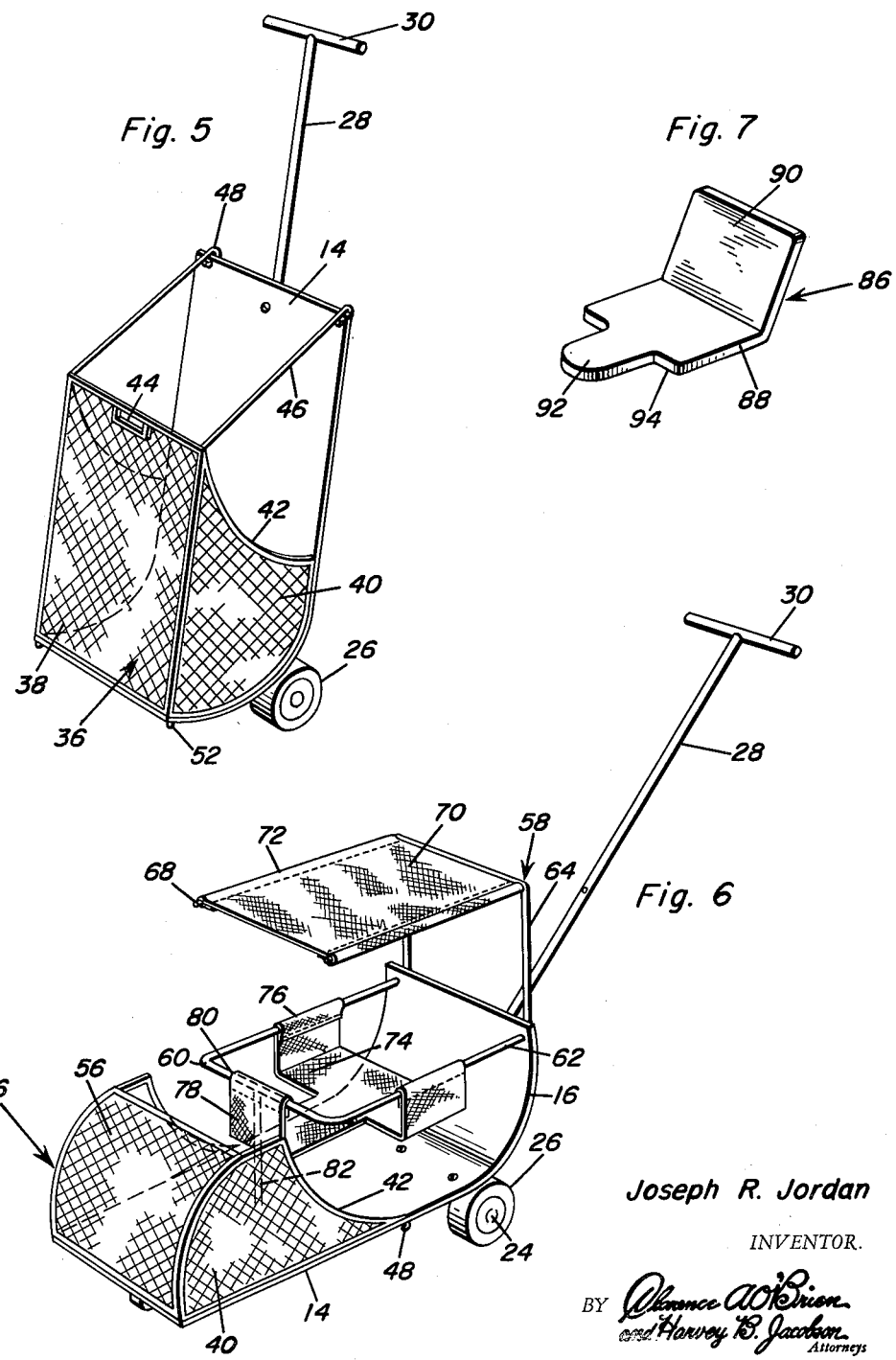

2,977,130

CONVERTIBLE SNOWPLOW AND WHEELED CART

Joseph R. Jordan, 2645 E. 28th, Kansas City, Mo.

Filed July 14, 1959, Ser. No. 826,976

7 Claims. (Cl. 280—47.18)

The present invention generally relates to a convertible wheeled car which is highly utilitarian and which, by rearrangement of component parts, may be employed for various purposes such as use as a snowplow, a two wheeled hand cart, a three wheeled vehicle, a two wheeled cart such as a grocery cart and a three wheeled baby stroller.

The primary object of the present invention is to provide a convertible utility cart employing as a basic element a generally L-shaped platform member having the short leg thereof curved and the elongated leg thereof generally straight together with wheel assemblies and handle assemblies that may be mounted in various manners for converting the assembly to various utilities.

Another object of the invention is to provide a convertible utility cart or hand truck which is extremely simple in construction, easy to use, utilitarian in each of its forms, and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the present invention when used as a snowplow;

Figure 2 is a perspective view of the invention when used as a two wheeled hand truck;

Figure 3 is a side elevational view when the device is used as a three wheeled truck;

Figure 4 is a sectional view taken substantially upon a plane passing along section line 4—4 of Figure 2 illustrating the details of the mounting means for the wheel assembly at the apex of the platform member;

Figure 5 is a perspective view of the invention when used as a grocery cart;

Figure 6 is a perspective view of the invention when used as a baby stroller; and Figure 7 is a perspective view of the seat and back member used when the device is used as a baby stroller.

Referring now specifically to the drawings, the numeral 10 generally designates the device of the present invention when used as a snowplow which includes a generally L-shaped platform member 12 including an elongated member or portion 14 forming the elongated leg of the L-shaped member and a relatively short portion or leg 16 which is curved in a smooth curve as illustrated in Figure 4. At the apex of the platform 12 there is provided a transverse support member 18 secured to the platform 12 by a plurality of fastener members such as bolts 20. Each end of the support member 18 is provided with a depending bracket 22 supporting an axle 24 having support wheels 26 thereon with the support wheels being disposed inwardly of the edges of the platform 12 whereby the platform 12 forms the outer limits of the cart.

The central fastening bolt 20 extends through the lower end of an elongated tubular handle 28 that has a transverse handle bar or handle grips 30 at the upper end thereof which may be of T-shaped construction as illustrated in Figure 1 or may be of two parallel tubular members curving outwardly at the upper end thereof with hand grips being provided thereon.

As illustrated in Figure 1, the device is used for a snowplow or scoop arrangement wherein the cart may be pushed with the free edge of the elongated leg 14 of the platform 12 sliding along a surface such as a sidewalk or the like wherein the snow will be accumulated on the upper surface of the platform 12. Then when the platform 12 is completely filled, the gathered snow may be either hauled to another area and dumped or otherwise disposed of. Another fastener bolt 32 is provided in the free edge of the center of the elongated leg 14 of the platform 12 for rigidifying the handle 28 when converting the device to the condition of Figure 2.

Figure 2 illustrates the device of Figure 1 with the handle 28 extending under the elongated leg 14 of the platform 12 with the hand grip or transverse member 30 being disposed at the free edge thereof whereby the device is used in the nature of a two wheeled hand truck.

Figure 3 of the drawings illustrates the platform 12 used in a similar nature as Figure 1 but there being provided a caster wheel 34 supporting the forward end of the elongated leg 14 and being mounted within a mounting hole provided therefor.

Figure 5 illustrates the same arrangement as illustrated in Figure 2 but with there being provided a basket member generally designated by the numeral 36 mounted on the front or upper surface of the platform 12 which basket member includes a front panel 38 and side panels 40 having curved edges conforming to the curvature of the short leg 16 and the long leg 14 of the platform 12 with the top edges of the side members 40 being cut away as designated by the numeral 42. The top edge of the panel 38 is provided with a hand hold opening 44 and rods 46 are connected to the upper corners of the basket 36 and each rod 46 is provided with a hook shaped end 48 for detachable engagement with apertures 50 in the corners of the free edge of the elongated leg 14. Also, the basket is provided with hooks or depending elements 52 extending through apertures 54 in the corners of the free edges of the short leg 16 of the platform 12. Thus, the basket 36 is detachably connected to the platform 12 and the device is useful in various utilities such as hauling groceries or the like.

Also, the basket 38 is provided with a curved bottom panel 56 interconnecting the end edges of the side panels 40 which forms a basket structure which can be removed from the cart by using the hand hold 44 wherein the device may be set upon the table surface or the like for ease of removal or unpacking of groceries.

Figure 6 illustrates the device employed as a baby stroller in which the device is used as a three wheeled cart substantially as in Figure 3 with the basket 36 being employed but arranged in a manner with the panel 38 engaging and being secured to the long leg 14 of the platform member 12 with the open area thereof facing upwardly.

Extending through the openings 54 is a pair of elongated U-shaped rod members 58 which have one end thereof interconnected by a transverse member 60. Extending rearwardly from the transverse member 60 is a pair of horizontal portions 62 terminating in upwardly extending rear portions 64 and forwardly extending horizontal portions 68 in spaced relation to the horizontal portions 62. Extending between the horizontal portions 64 is a roof panel or awning 70 which has side hems 72 which are slidable on the horizontal rod portions 68. Slidable on the horizontal portions 62 is a transverse fabric support member 74 having end hem portions 76 receiving the rod portions 62. Extending outwardly from the center of the transverse member 74 is a forwardly extending support member 78 having a hem portion 80 engaging the transverse rod member 60. Extending downwardly from the rod member 60 at the center thereof is a support 82 which is rigidly affixed to the rod member 60 and which extends down through an opening 84 which has a nut secured to the undersurface of the platform 12 whereby the support member 82 may be threaded into the nut and thus rigidly affixed to the platform 12 for supporting the horizontal member 60 to which it may be connected by a swivel or any other detachable connection.

Figure 7 illustrates the seat member generally designated by the numeral 86 which is to be employed in the stroller and which includes a seat 88 and a back member 90. The seat 88 is provided with a narrowed projection 92 defining two side recesses 94 which would normally would be aligned with the front edge of the support 74 with the side edges of the projection 92 aligning with the member 78 whereby a rigid seat and back is provided for a child while being strolled in the stroller.

In assembling the device, the elements 74 and 78 are assembled with the wire rod member 58 and the free ends then threaded through the openings 54. Thereafter, the support 82 is rigidly affixed to the platform and to the rod member 60 and the cover or canopy 70 is placed on the wire rods in an obvious manner. In this form of the invention the baby stroller or carriage is also usable for carrying purchased articles such as groceries or the like.

The device may be made of various readily obtainable materials and the size of the device may vary. However, it is found that an over-all length for the platform in the neighborhood of 30 to 36 inches is acceptable when the handle is approximately 40 inches in length which facilitates the use of the device by adults. Of course, the dimensions may vary and still fall within the scope of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A convertible cart comprising a one-piece generally L-shaped platform of rigid sheet material with the short leg of the platform being curved, an axle supported transversely at the outside of the apex of the platform, a wheel on each end of the axle, a handle detachably connected to the platform and extending selectively from the end edges thereof with the device forming a two wheeled hand cart when the handle extends from the free edge of the elongated leg of the platform and forming a snowplow when the handle extends from the free edge of the short leg of the platform, a generally U-shaped bracket supporting said axle from the platform, the axle being supported from the legs of the U-shaped bracket, the bight portion of the U-shaped bracket being secured to the apex of the platform by three bolts whereby the two outer bolts may be removed and the axle and support bracket pivoted about the center bolt, said handle being mounted on the center bolt for orientating the handle selectively under the short and long leg of the platform.

2. A convertible cart comprising a one-piece generally L-shaped platform of rigid sheet material with the short leg of the platform being curved, an axle supported transversely at the outside of the apex of the platform, a wheel on each end of the axle, a handle detachably connected to the platform and extending selectively from the end edges thereof with the device forming a two wheeled hand cart when the handle extends from the free edge of the elongated leg of the platform and forming a snowplow when the handle extends from the free edge of the short leg of the platform, a caster wheel mounted on and supporting the free edge portion of the elongated leg of the platform when the handle extends from the free edge of the short leg of the platform thereby providing a three wheeled cart with the caster wheel forming the front wheel whereby the cart may be steered by exerting lateral pressure on the handle.

3. A convertible cart comprising a one-piece generally L-shaped platform of rigid sheet material with the short leg of the platform being curved, an axle supported transversely at the outside of the apex of the platform, a wheel on each end of the axle, a handle detachably connected to the platform and extending selectively from the end edges thereof with the device forming a two wheeled hand cart when the handle extends from the free edge of the elongated leg of the platform and forming a snowplow when the handle extends from the free edge of the short leg of the platform, basket means disposed on the platform for retaining articles such as groceries when the device is used as a two wheeled hand cart, said basket means including an outer panel in spaced parallel relation to the elongated leg of the platform, side panels connected to the outer panel and having edges conforming to the curvature of the short leg of the platform and the adjacent portion of the long leg thereof, and means detachably connecting the panels to the platform for providing a grocery basket type cart.

4. The combination of claim 3 wherein said outer panel is provided with a hand hold opening for facilitating handling of the basket, a bottom panel interconnecting the end edges of the side panels and curved to conform to the curvature of the short leg of the platform whereby the basket will serve as an article carrier when removed from the platform.

5. A convertible cart comprising a one-piece generally L-shaped platform of rigid sheet material with the short leg of the platform being curved, an axle supported transversely at the outside of the apex of the platform, a wheel on each end of the axle, a handle detachably connected to the platform and extending selectively from the end edges thereof with the device forming a two wheeled hand cart when the handle extends from the free edge of the elongated leg of the platform and forming a snowplow when the handle extends from the free edge of the short leg of the platform, a caster wheel mounted on and supporting the free edge portion of the elongated leg of the platform thereby providing a three wheeled cart with the caster wheel forming the front wheel whereby the cart may be steered by exerting lateral pressure on the handle, a pair of vertically disposed U-shaped wire rod members connected with the free edge of the short leg of the platform when the long leg thereof is disposed horizontally, the upper ends of the U-shaped wire members being free, a transverse rod member interconnecting the lower end of the U-shaped rod members retaining the same in spaced parallel relation, a transverse seat support member of flexible material connected to the lower leg of the U-shaped wire rod members, a crotch piece supporting flexible member attached to the seat supporting member and connected with the transverse member interconnecting the free ends of the wire rods, and a generally L-shaped rigid seat member supported on the seat support member with the rigid seat member having an upstanding rigid back for resting on the short leg of the platform thereby providing a stroller.

6. The combination of claim 5 wherein a cover panel is provided between the upper parallel legs of the U-shaped rod members thereby providing a sun shade for the occupant of the stroller, and a vertical support member detachably connected to the elongated leg of the platform and to the transverse member interconnecting the lower ends of the U-shaped wire rods.

7. The combination of claim 6 together with basket means detachably supported on the platform forwardly of the stroller seat for carrying articles.

References Cited in the file of this patent

UNITED STATES PATENTS

| | | |
|---|---|---|
| 861,308 | McMann | July 30, 1907 |
| 1,006,985 | Smith | Oct. 24, 1911 |
| 1,015,969 | McCrary | Jan. 30, 1912 |
| 1,475,785 | Bergstrom | Nov. 27, 1923 |
| 2,320,387 | Schroeder | June 1, 1943 |
| 2,579,077 | Hubner | Dec. 18, 1951 |
| 2,786,692 | Timpson | Mar. 26, 1957 |